(12) United States Patent
Nakamura

(10) Patent No.: US 6,270,667 B1
(45) Date of Patent: Aug. 7, 2001

(54) OIL FILTER NOT USING FILTER PAPER BUT USING PERMANENT MAGNETS

(76) Inventor: Koji Nakamura, 5-1-13 Minami-Karasuyama, Setagaya-Ku, Tokyo 157 (JP)

( * ) Notice: Subject to any disclaimer, the term of this patent is extended or adjusted under 35 U.S.C. 154(b) by 0 days.

(21) Appl. No.: 09/451,232

(22) Filed: Nov. 29, 1999

Related U.S. Application Data

(63) Continuation-in-part of application No. 09/091,032, filed on Oct. 28, 1998, now abandoned.

(30) Foreign Application Priority Data

Dec. 6, 1995 (JP) .................................................... 7-344314
Nov. 29, 1996 (JP) ...................................... PCT/JP96/03506

(51) Int. Cl.[7] .................................................. B01D 35/06
(52) U.S. Cl. ......................... 210/222; 210/695; 184/6.25
(58) Field of Search ............................. 210/222.695, 223; 184/6.25; 123/536, 538

(56) References Cited

U.S. PATENT DOCUMENTS 2,317,774 * 4/1943 Kiek et al. ............................ 210/222
3,170,871 * 2/1965 Moriya .................................. 210/222

FOREIGN PATENT DOCUMENTS 236300   8/1990 (JP).
2516528  7/1996 (JP).

OTHER PUBLICATIONS

English translation of Japanese Patent No. 236300.
English translation of Japanese Patent No. 2516528.

* cited by examiner

Primary Examiner—David A. Reifsnyder
(74) Attorney, Agent, or Firm—Trexler, Bushnell, Giangiorgi, Blackstone & Marr, Ltd.

(57) ABSTRACT

An oil filter, not using a filter paper element, and not having a strainer component, including an array of relatively large permanent magnets, either disc-shaped or stick-shaped. The array is dimensioned to occupy an area which is substantially equal to an area within a case for said array of permanent magnets, such that the array substantially fills the entire area of the case element. The individual permanent magnets within the array are separated equidistantly from one another by non-magnetic separating elements and the equidistant separation interval is less than half of an interval that the individual permanent magnets would naturally repel one another as a result of the magnets being positioned in opposing polar relationship. The relatively large dimension of the individual permanent magnets within the case element allows the filter to remove metallic microparticles more efficiently than in the past.

14 Claims, 8 Drawing Sheets

(a)

(b)

(a)

(b)

OIL FILTER NOT USING FILTER PAPER BUT USING PERMANENT MAGNETS

CROSS-REFERENCE

This a continuation-in-part of application Ser. No. 09/091,032 filed on Oct. 28, 1998 entitled "Oil Filter Not Using Filter Paper But Using Permanent Magnets" now abandoned.

BACKGROUND OF THE INVENTION

This invention pertains to oil filters that use permanent magnets, instead of (or as an adjunct to) paper filters, to remove micro particles (between 40 micro millimeter and about 1 micro millimeter) that cannot be removed by conventional paper filter, as well as to prevent the degradation process of oil with the magnetic array. This will extend the life of instruments, improve fuel efficiency, reduce air pollution, and reduce waste products from disposing the filter cartridges by replacing the conventional oil filters and strainers, which use paper filter, that are installed on automobiles, motor cycles, trains, boats, airplanes, industrial vehicles and machinery, etc.

Contemporary or traditional oil filters are available in two types: element-exchangeable, full-flow filters and spin-on oil filters. The element exchangeable, full-flow filter does not have a relief valve but the filter paper is replaceable. With spin-on filters, a relief valve element and casing are formed together, and the paper filter is integral to the device. Both types use paper as the primary filter element.

The present invention makes a distinction between oil filters that use a paper filtering element and those, such as the invention, that use permanent magnets (positioned like pole to like pole, with intermingling magnetic fields) as the agent for removing microscopic metallic particles from lubricating fluid. Contemporary or traditional oil filters utilize temporary, paper filtering elements that cannot remove particles smaller than approximately 40 micro millimeters. The present invention represents an improvement in the art through its ability to remove from lubricating oil the smallest measurable metallic particles.

Approximately 50 million new cars are manufactured around the world each year with an average operating span of 9.3 years in Japan, 11 years in the United States and 12 years in Germany. If an average ten-year automobile operating span is assumed, roughly 500 million automobiles are in use simultaneously around the globe. With this figure, and the additional assumption that oil filters (or their paper elements) are replaced once a year, the number of oil filters with paper elements used annually, exceeds 500 million. Add the fact that new cars come with paper filters installed, and the annual use of paper oil filter elements reaches nearly 600 million units. The average amount of paper used in one filter cartridge is approximately 23.5 grams. 80,000 tons of wood is required to produce 600 million, 23.5 gram paper filter elements. Additionally, 40 to 60 thousand tons of wood (or 40 to 60 thousand trees) is necessary every year to produce paper packaging for these oil filters. If we take into consideration motorcycles, industrial vehicles, hydraulic machinery, air compressor, etc., an estimated 200 thousand tons of wood (or 200 thousand trees) consumed each year just for the production and packaging of oil filters. Furthermore, the kind of long fiber used in filter paper is harvested primarily from coniferous trees, which grow comparatively slowly. Consequently, extending the life of lubricating oils and machinery, reducing fuel consumption and the emission of polluting gases, and decreasing the volume of waste from disposable, paper oil filters, are each significant elements in any environmental protection strategy. There is a need for a new kind of oil filter that will be a solution to these problems.

It is reported above that permanent magnets can be used to remove microscopic metallic particles from the lubricating oil of internal combustion engines such as those used in trucks, automobiles, motorcycles, and trains, etc. But there are two different approaches to appropriating permanent magnets for this purpose. One approach is to place multiple magnets such that their North and South poles face each other and let oil flow between them.

Another approach is to position multiple magnets such that each magnet's North pole faces to another magnet's North pole, and each magnet's South pole faces another magnet's South pole while oil flows between these opposing magnetic fields. Regarding this method, the inventor in question has submitted patent applications—"lubricant anti-deterioration device using magnets (publication#6-9984)" and "removal of magnetic metal particles in a liquid and anti-scaling with removal device (publication#2-36300)"—for the efficacious placement of repelling permanent magnets. Any of these devices are to be used together with oil filters that utilize paper elements and which purpose is to attract magnetic metal particles in motor oil, and to delay oil degradation by the imposition of magnetic fields. By combining the opposing magnet device and oil filters with paper elements, maximum oil cleaning and maintenance will be achieved.

OBJECTS AND SUMMARY OF THE INVENTION

In general, the new invention improves the state of the art by replacing oil filters that utilize paper filtering elements with filters that use magnets placed in repelling positions to remove metallic particles from engine oil.

The purpose of this invention is to remove microscopic metal particles from engine oil, to stabilize oil chemistry by preventing heat induced bond breakage, to maintain oil viscosity and prevent oil degradation. All this keeps oil in optimal condition for a longer time, which in turn keeps internal combustion engines, transmissions, decelerators and hydraulic machinery in optimal condition which leads to improved fuel economy, cleaner exhaust and longer engine life. The repelling magnet oil filter lasts the life of the vehicle and simply needs to be cleaned about every 60,000 miles. Collateral benefits of the invention includes the annual saving of hundreds of thousands of tons of timber ordinarily used in the manufacture of paper filters, the reduction of the waster disposal requirements associated with used paper filters or filter elements and the reduction of air pollution caused by toxic exhaust emissions.

A more specific objective of this invention is to replace paper elements of oil filters with disk shape magnets. The magnets are positioned the same distance from each other with magnetic fields opposed—North pole to North pole, and South pole to South pole. The distance between magnets should be at most one half of the distance the same magnets would be kept apart from each other when placed vertically stacked with repelling sides facing against each other (the lower magnet must be placed on a non-magnetic material). Placed between the magnets are position supporters composed of non-magnetic material drilled with holes to let oil flow through. This array of multiple permanent magnets is stacked equidistant in polar opposition by a non-magnetic, porous framework around a central tube. It is an oil filter that uses permanent magnets in place of paper filters for the purpose of preventing wearing at lubricated areas by attracting magnetic micro particles in lubricant and preventing oil degradation by the use of magnetic field.

Still another objective of the present invention is to provide an oil filter with disc-shaped magnets that will completely replace an existing paper oil filter.

A related objective of the present invention is to provide an oil filter with relatively large disc-shaped magnets which has the same or similar dimensions as the paper oil filter which it Yet another related objective of the present invention is to provide an oil filter with relatively large disc-shaped magnets having an outer diameter and an inner diameter, the difference between the outer diameter and the inner diameter, divided by the thickness at the disc-shaped magnet, being greater than or equal to 0.6.

Another related objective of the present invention is to provide an oil filter with relatively large disc-shaped magnets that will completely replace an existing paper oil filter without the use of a strainer element, which strainer element tends to clog and require cleaning with use of the oil filter.

Another objective of this invention is to replace paper elements of oil filter with relatively large rectangular cubic permanent magnet rods which has poles sideways. The multiple magnet rods are placed on a circle with only South or North poles facing toward the center of the circle; the other pole facing away from the circle. The magnets are positioned equidistant from a central point and the distance between magnets should be no more than the distance the magnets keep apart from each other when one is placed above the other with repelling poles facing against each other (this time, the lower magnet must be placed on a non-magnetic material). Placed inside of the magnet ring is a plate interspersed with holes to create turbulence in oil flow. The lengthwise ends of the ring of magnets are placement framework to keep the magnets in place. This combination of multiple permanent magnets forms a filtering element maintained in a non-magnetic element case. It is an oil filter that uses permanent magnets in place of paper filter for the purpose of preventing wearing at lubricated areas by attracting magnetic micro particles in lubricant and preventing oil degradation by the use of magnetic field.

The example uses for this new oil filter arc (1) an oil filter integrally consisting of the nonmagnetic oil element case and the filter element made up with multiple number of disk and/or rod shaped permanent magnets (both to be called magnet filter clement from here), such as the magnet filter element encased in a non-magnetic oil element case where the magnet element is fixed by a spring, (2) oil filters consisting of a magnet filter element and a non-magnetic oil element case that is not fixed on the such devices as internal combustion system, transmission, decelerator, hydraulic machinery, from which magnet filter elements are removable, (3) oil filters consisting of a magnetic filter element and a non-magnetic oil element case that is removably fixed onto such devices as internal combustion engines, transmissions, decelerators and hydraulic machinery.

It is important to note that this invention uses a magnet filter element in place of paper filter elements in the oil filter, by placing each of the component magnets close together with opposing poles facing each other to let oil flow through them in order to remove metal particles and to prevent degradation of oil by the use of magnetic field. By using a large magnets utilizing the space that would normally be occupied by a paper filter, the objectives of this invention are attained by ensuring attraction of the magnetic micro particles and by extending the time for the oil to flow through the magnetic field.

Therefore it should be clear that this invention is intended to replace paper elements in the oil filter with repelling large magnets (N to N, S to S) utilizing the space that would be occupied by a paper filter. This is to ensure removal of magnetic micro particles in the oil with large areas of attraction and to extend the time between cleaning of the parts. In addition, by placing the magnets and the repelling magnetic fields closer together, it has wider effective area, hence, extending the time in which the oil goes through the magnetic field.

Conventional oil filters that utilize paper elements cannot isolate metal particles smaller than 30 to 40 micrometers in diameter. This freely circulating metallic powder significantly accelerates the degradation of oil, because about 800 degrees Celsius is created at the origin of an iron particle. This excessive heat causes the chains of oil molecules to crack and produce carbon, which darkens the oil—the visual evidence of its degradation. The presence of friction inducing particles, and the failure of degraded oil to protect the engine's interior surfaces from that friction. soon results in higher engine temperature, further oil degradation and the secondary and tertiary wear of engine parts.

As this invention, through a particular placement of permanent magnets (North pole to North pole, South pole to South pole), stabilizes the oil molecules and prevents carbon extraction by heat and shortening of oil molecule chains, the benefits of fine metal particle removal are amplified. Also use of large magnets is possible which produces better results by extending the oil's exposure to magnetic influence.

Additionally, an indirect, preventive benefit of the invention (and its reduction of the magnetic particles mixed with the oil) is improved sealing between cylinder and piston walls which minimizes the blow-by gas commonly associated with a loss of compression.

The invention is applicable to any device that uses a reservoir of oil to lubricate its moving parts, such as internal combustion system, transmission, decelerator, hydraulic machinery, etc. on water or wind powered plants, refrigerators, steam turbines, automobiles, motorcycles, rail transporters, airplanes, boats, load movers, such as forklifts, power tools and industrial machinery.

DESCRIPTION OF THE PREFERRED EMBODIMENTS

Figure 1:
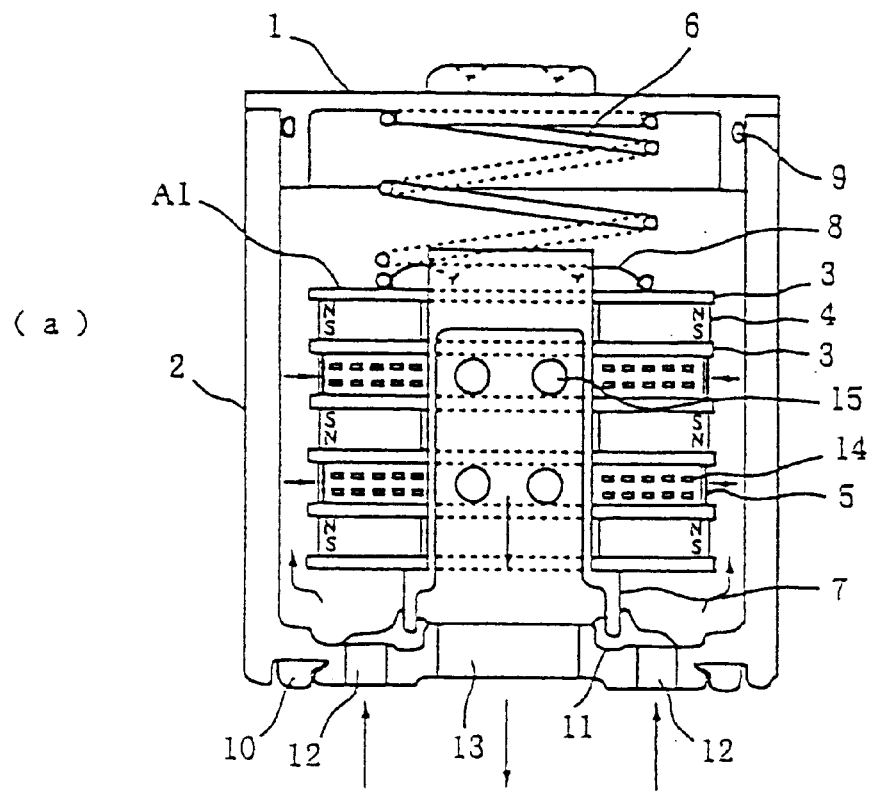
FIGS. 1(*a*) and 1(*b*) describe one of the usage examples with the newly invented paperless oil filter utilizing magnet filter element as a spin-on oil filter for automobiles.
Figure 1:
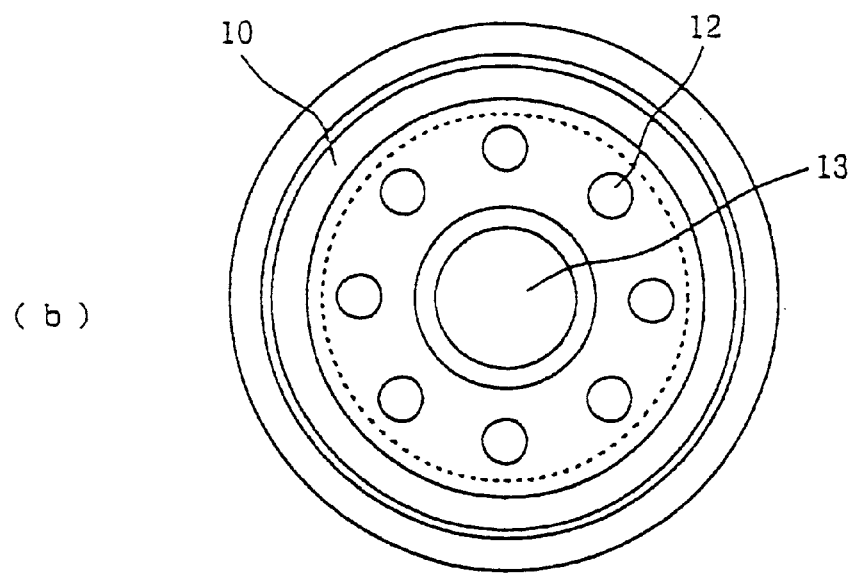

The newly invented paperless oil filter utilizing permanent magnets consists of multiple disc or rectangular cube-shaped permanent magnets positioned propinquitously in repelling position (N to N, S to S) around a point. When oil flows among the magnets and through induced turbulence, the magnetic particles are attracted, and the oil is treated by the magnetic field to prevent degradation. By use of larger magnets utilizing the space that would ordinarily be occupied by a paper filter element, the objectives of this invention are attained thereby ensuring the removal of the magnetic micro particles and extending the time the oil spends in the magnetic field.

Referring now to the drawings, in which like numerals refer to like elements throughout:

Embodiment No. 1

FIG. 1 indicates the application of the oil filter not using a filter paper but using permanent magnets as a spin-on oil filter for automobiles. (a) in FIG. 1 is a cross-sectional view and (b) is the base view of the filter.

FIG. 1 describes a sample oil filter in which the non-magnetic oil element casing and the disk-shaped, magnetic filter elements are integral to each other. The filter elements are constructed as described in the same diagram, and referred to as disk-shaped magnet element A1. The center-holed, disk-shaped Permanent magnets 4 have flat, polar sides attached to yokes 3. The element set bolt 7 is placed through the center holes of said magnets. Opposing, like magnetic poles are positioned so that their magnetic fields repel each other continually. Between the adjacent, disc-shaped magnets reside supportive structures 5 permeated by holes 14 through which oil flows. A nut 8 on the top end, and a rubber flow controller 11 is positioned on the bottom end of the element set bolt 7. The disk-shaped magnetic element replacement for a paper filter is designated A1.

To make removal of the disk-shaped magnetic element A1 feasible, the outer part has a two part structure. The disk-shaped magnetic element Al which resides within the non-magnetic element case 2 is held in place by a set spring 6 above the disk-shaped magnetic element A1 and the oil element cap 1 with O-ring 9 to secure the oil element case 2.

As the arrows indicate, oil enters into the oil filter through the oil intake 12, through holes 14 in the support plate 5, between poles of the disc-shaped magnets 4, and the element set bolt 7 and oil route 15, and exits through the outlet 13 and returns to lubricate the host machinery. Embodiment No. 1 is attached to host machinery with case O-ring 10.

By flowing the oil through magnetic fields generated by large permanent magnets, in which N poles and N poles, and S poles and S poles are repelling each other, rather than through conventional, paper-based oil filtering elements, a significantly larger percentage of metal particles are removed from the lubricating oil. Also, longer intervals between magnetic element cleanings are achieved with larger magnets, because the areas of attraction and holding are greater. Furthermore, the larger the area of the magnetic field created by the opposing or repelling poles of the adjacent magnets, the longer the oil is exposed to the magnetic field and its degradation retarding properties.

Preferably, the dimensions of the relatively large disc-shaped magnets 4 are such that the outer diameter of each magnet minus the diameter of the center hole (i.e., the inner diameter), divided by the width of each magnet, is greater or equal to 0.6. It has been found that this provides optimal performance characteristics.

The oil element case 2 is made with non-magnetic material and there is no particular choice of material to be used. The group of example materials include copper metal (yellow copper, bronze phosphate, nickel silver, aluminum bronze), and aluminum and its kind, magnesium and its compound, titanium and its compound, zinc and its compound, lead and its compound, stainless steels. These materials surfaces are treated.

Figure 3:
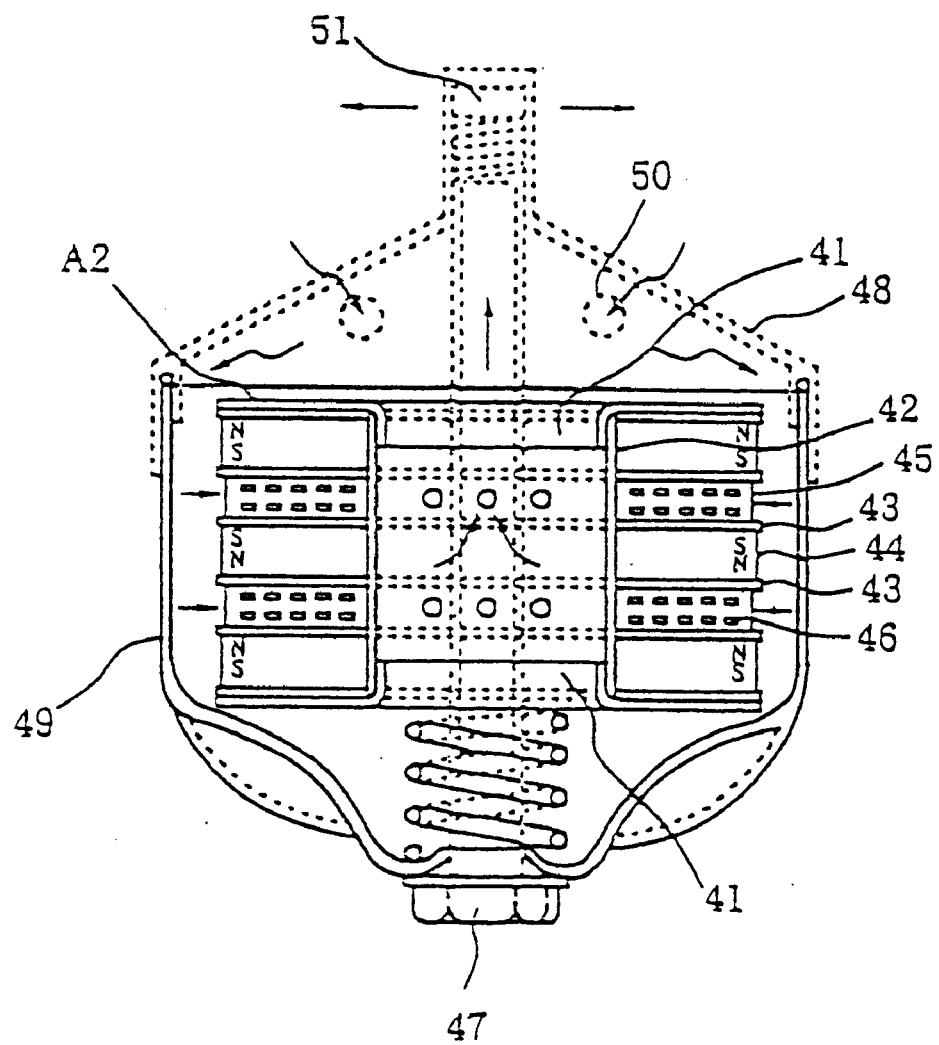
FIG. 3 describes one of the usage examples with the newly invented paperless oil filter utilizing magnet filter element as a full-flow element exchangeable oil filter for automobiles.

It is also important to note that no metal strainer element, such as that depicted as reference No. 10 in FIG. 3 of Japanese Patent No. 2516528, is required with use of the present invention. Strainer elements, of course, tend to clog with metallic particles and require periodic cleaning in order to prevent diminished performance.

Although FIG. 1 refers to spin-on type automobile oil filters, the same filter can be used on motorcycles, industrial vehicles, hydraulic machinery and air machinery, as long as similar forms of oil filters are used.

Embodiment No. 2

Figure 2:
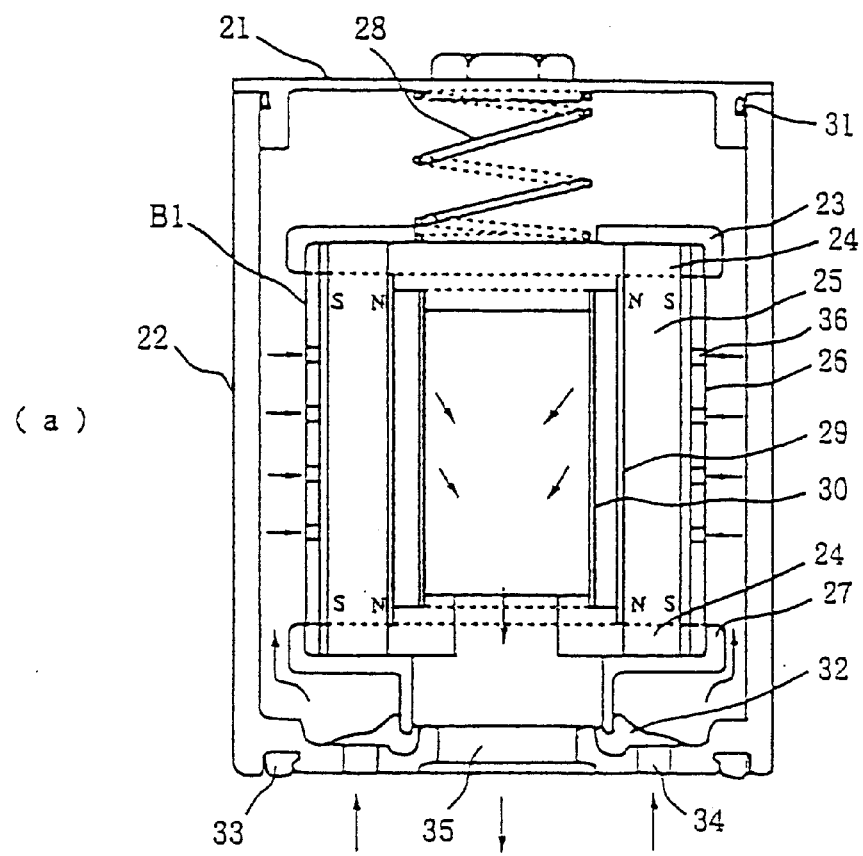
FIGS. 2(*a*) and 2(*b*) describe another usage example with the newly invented paperless oil filter utilizing magnet filter element as a spin-on oil filter for automobiles.
Figure 2:
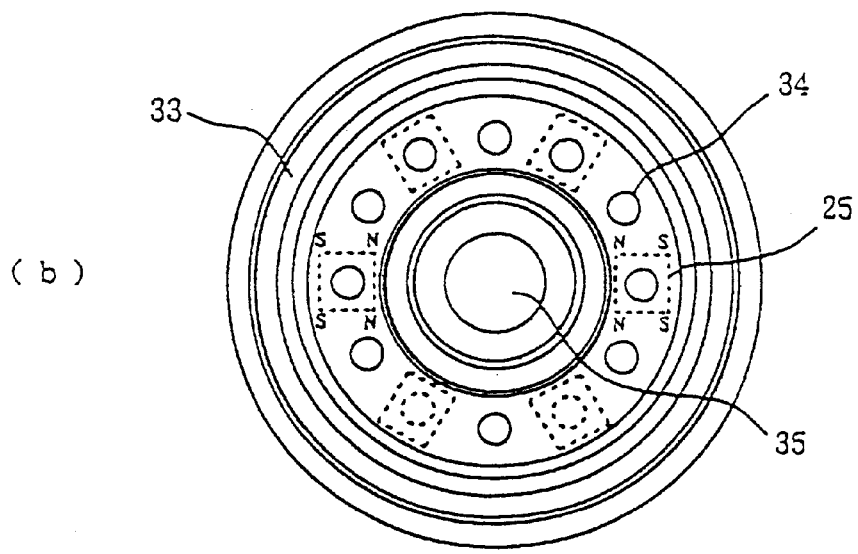

FIG. 2 describes another embodiment of the oil filter not using a filter paper but using permanent magnets as a spin-on oil filter for automobiles. (a) in FIG. 2 is a cross-sectional view and (b) is the base view of the filter.

FIG. 2 depicts an embodiment that replaces a paper filter with rectangular-cube shaped magnets 25 which opposing, lengthwise poles are arrayed on a circle around a point at constant intervals with the same pole facing the point and the opposite poles facing away from the point. The rectangular-cube shaped magnets are fixed in place with the set plate 24, top end plate 23, lower end plate 27 on each end.

The turbulence-creating plates 29 and 30 are located within the circular array formed by the placement of the rectangular-cubic magnets 25. Surrounding the circular array formed by the rectangular-cubic magnets is a perimeter 26 with holes 36 expediting the flow of oil. The rectangular-cube magnets 25 are fixed in place by a set plate 24. A rubber anti-flowback valve 32 is positioned on the end plate 27. We will call this rectangular-cubic magnet element B1 to replace paper filter elements.

To make removal of the rectangular-cubed magnet element B1 possible, the casing has a two part structure. The rectangular-cubed magnet element B1 placed inside the non-magnetic element case 22 is held in place by set spring 28 above the rectangular-cubed magnet element B1 and the oil element cap 1 with cap O-ring 31 to close the oil element case 22. This procedure makes the oil filter with such characteristics as paperless filtration and strong repelling magnetic fields.

As the arrows indicate, oil enters into the oil filter through the oil intake 34, through holes 36 of outer tube 26, between rectangular-cube magnets 25, and the turbulent plates 29, 30, and exit through the outlet 35 to return to the cycle flow. 33 is the case O-ring.

By flowing the oil through magnetic fields between large, permanent, rectangular-cube magnets, like above, where N poles and N poles, and S poles and S poles are repelling each other, rather than the conventional, paper-based oil filter elements, attraction of the metal particles to the permanent magnets are more reliable. Also, the larger the magnets, the larger the areas of attraction. This results in longer intervals between magnetic filter element cleanings. And again, it should be noted that no strainer element is needed nor desired.

Embodiment No. 3

FIG. 3 indicates the application of the oil filter not using a filter paper but using permanent magnets as a full-flow element exchangeable oil filter for automobiles. (a) in FIG. 3 is a cross-sectional view and (b) is the base view of the filter.

FIG. 3 describes a sample oil filter in which the non-magnetic oil element casing and the disk-shaped, magnetic filter elements are separable. The filter elements are constructed as described in the same diagram, and referred to as disk-shaped magnet element A2. The center holed, disk-shaped permanent magnets 44 have flat, polar sides attached to yokes 43. The inner tube 42 is placed through the center holes of said magnets. Opposing, like magnetic fields repel each other continually. Between the adjacent, disc-shaped magnets reside supportive structures 45 permeated by holes 46 through which oil flows. The set end plat 41 is placed on each end of the inner tube 42. The disk-shaped magnetic element replacement for a paper filter is designated A2.

The disk-shaped magnetic elements A2 with non-magnetic oil element casing 49 will be installed onto the case cap 48 on the engine with a center bolt 47.

As the arrows indicate, oil enters into the oil filter through the oil intake 50, through holes 46 in the support place 45, between poles of the disk-shaped magnets 44, and into the center bolt 47 space, and exits through the outlet 51 and returns to lubricate the host machinery.

By flowing the oil through magnetic fields generated by large permanent magnets, in which N pole and N poles, and S poles and S poles are repelling each other, rather than through conventional, paper-based oil filtering elements, a significantly larger percentage of metal particles are removed from the lubricating oil. Also, longer intervals between magnetic element cleanings are achieved with larger magnets, because the areas of attraction and holding are greater. Furthermore, the larger the area of the magnetic field created by the opposing poles of the adjacent magnets, the longer the oil is exposed to the magnetic field and its degradation retarding properties:

Preferably, the dimensions of the relatively large disc-shaped magnets 4 are such that the outer diameter of each magnet minus the diameter of the center hole (i.e., the inner diameter), divided by the width of each magnet, is greater or equal to 0.6. It has been found that this provides optimal performance characterizes.

Although FIG. 3 refers to full-flow element exchangeable type automobiles oil filter, the same filter can be used on motorcycles. industrial vehicles, hydraulic machinery and air machinery, as long as similar forms of oil filters are used.

It is also important to note that no metal strainer element, such as that depicted as reference No. 10 in FIG. 3 of Japanese Patent No. 2516528, is required with use of the present invention. Strainer elements, of course, tend to clog with metallic particles and require periodic cleaning in order to prevent diminished performance.

Embodiment No. 4

Figure 4:
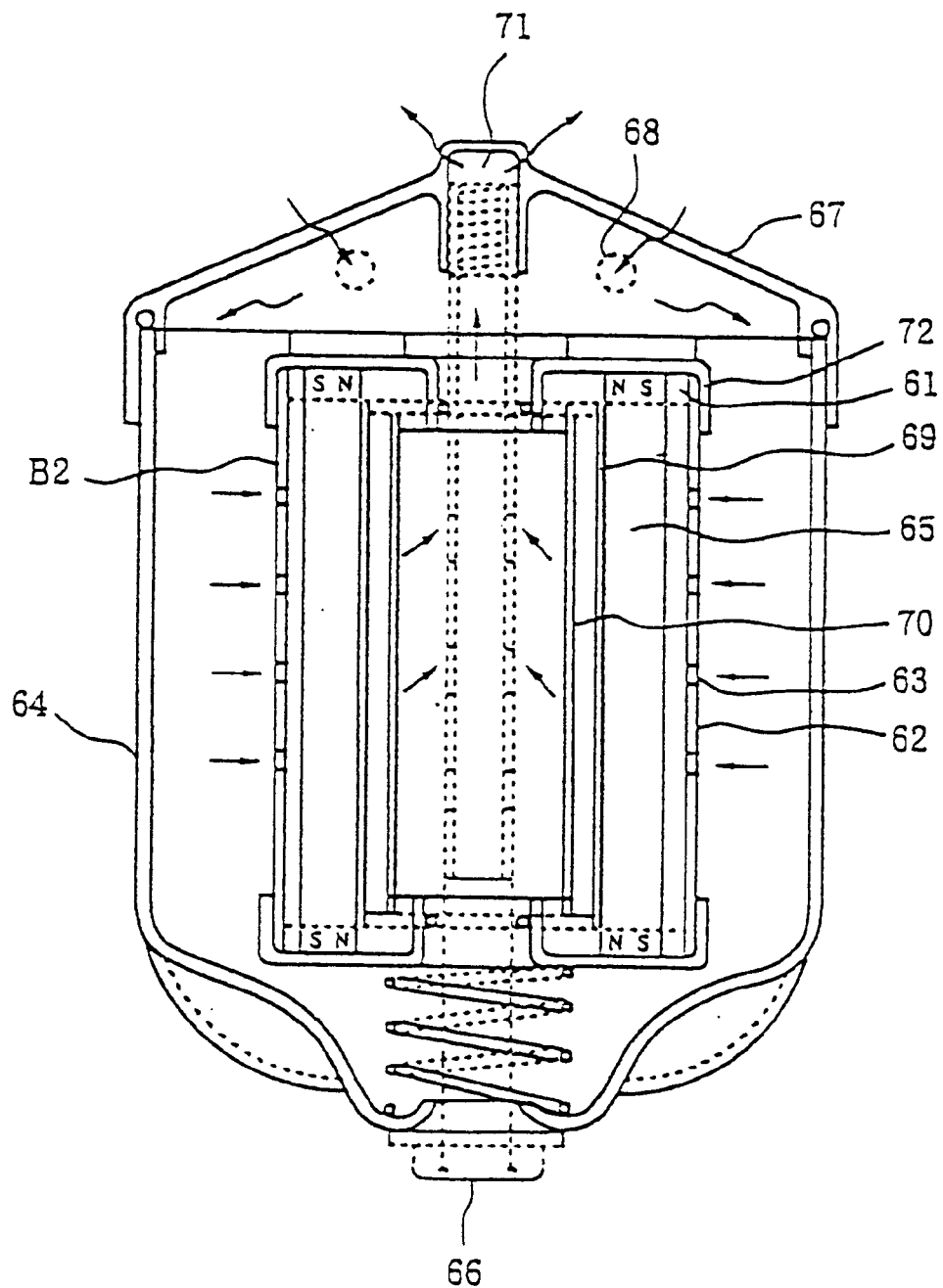
FIG. 4 describes another usage example with the newly invented paperless oil filter utilizing magnet filter element as a full-flow element exchangeable oil filter for automobiles.

FIG. 4 describes another embodiment of the oil filter not using a filter paper but using permanent magnets as a full-flow element exchangeable oil filter for automobiles. (a) in FIG. 4 is a cross-sectional view and (b) is the base view of the filter.

FIG. 4 describes an oil filter in which the non-magnetic oil element casing and the magnetic filter elements, that are separable from each other. The filter elements are, in pace of paper filter elements, made up of rectangular-cube-shaped magnets 65 which opposing, lengthwise poles are arrayed on a circle around a point at constant intervals with the same pole facing the point and the opposite poles facing away from the point. The rectangular-cube shaped magnets 65 are fixed in place with the set plate 61. The turbulence-creating plates 69 and 70 are located within the circular array formed by the placement of the rectangular-cubic magnets 65. Along with the turbulence-creating plates 69 and 70, the support plate 62 with holes 63 expediting the flow of oil are fixed in place by the end plates 72. The filter elements constructed described here is referred to as stick-shaped magnet element B2.

The magnetic elements B2 with non-magnetic oil element casing 64 will be installed onto the case cap 67 on the engine with a center bolt 66.

As the arrows indicate, oil enters into the oil filter through the oil intake 68, through holes 63 in the support plate 62, between poles of the stick-shaped magnets 65, and into the center bolt 66 space, and exits through the outlet 71 and returns to lubricate the host machinery.

The procedure makes the oil filter with such characteristics as paperless filtration and strong repelling magnetic fields.

By flowing the oil through magnetic fields between large, permanent, rectangular-cube magnets, like above, where N poles and N poles, and S poles and S poles are repelling each other, rather than the conventional, paper-based oil filter elements, attraction of the metal particles to the permanent magnets are more reliable. Also, the larger the magnets, the larger the areas of attraction. The results in longer intervals between magnetic filter element cleanings.

The above invention refers to full-flow element exchangeable type automobiles oil filter, and among its distinct characteristics are that it replaces the disposable paper filter elements, it can be removed from the casing for a cleaning, and it produces a strong repelling magnetic field. Once again, however, unlike in Japanese Patent No. 2516528, no strainer is required.

Although FIG. 4 refers to full-flow element exchangeable type automobiles oil filter, the same filter can be used on motorcycles, industrial vehicles, hydraulic machinery and air machinery, as long as similar forms of oil filters are used.

Embodiment No. 5

Figure 5:
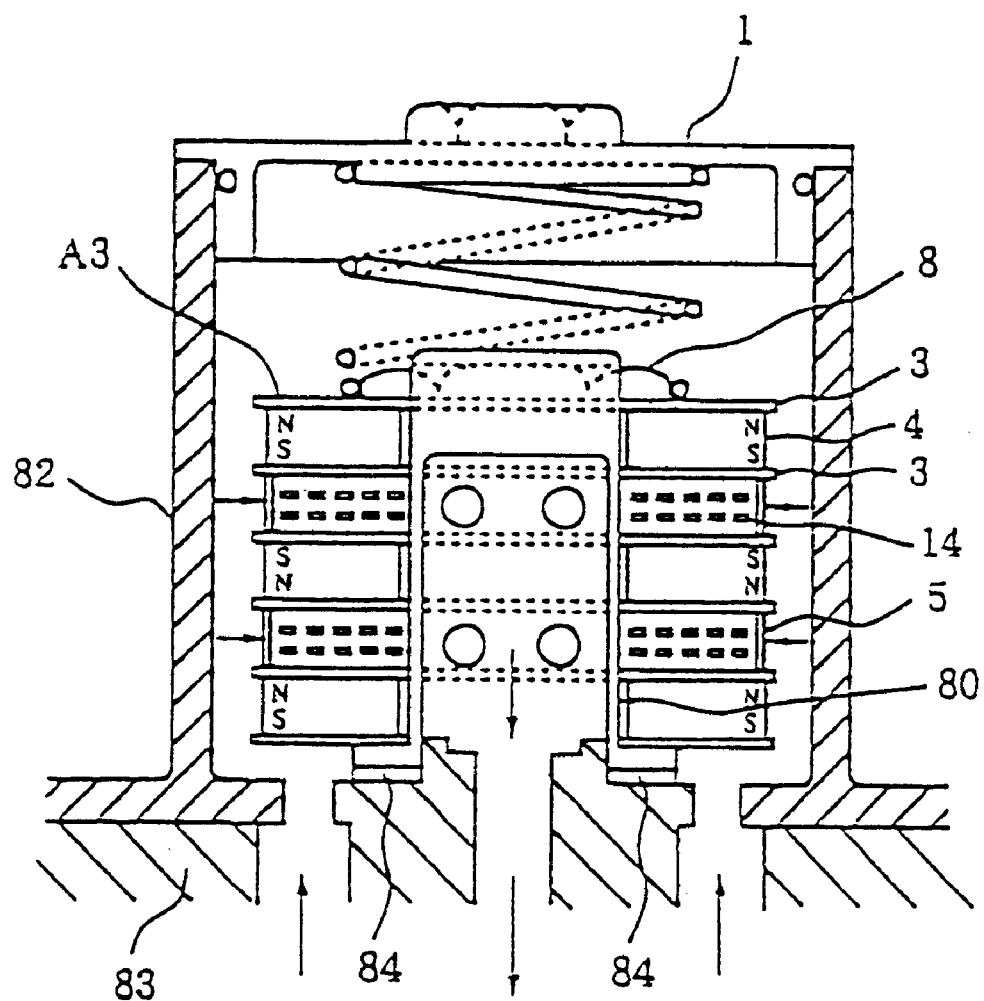
FIG. 5 describes one of the usage examples with the newly invented paperless oil filter utilizing magnet as a filter insert.

FIG. 5 depicts the application of the oil filter not using a filter paper but using permanent magnets that replaces an inside cartridge type oil filter.

The oil filter of FIG. 5 consists of a non-magnetic oil element case that is firmly attached to the machinery and an exchangeable disc-shaped magnetic elements. The disc-shaped magnetic element is applied to a paper oil filter element. The disc-shaped magnetic element A3 in FIG. 5 consists of disc-shaped permanent magnets 4, yokes 3, an element set bolt 80, non-magnetic support plates 5 and nuts 8. The disc-shaped permanent magnets 4 have magnetic fields on each end. The yokes 3 are attached to the both sides of magnets' 4 end. The magnets 4 are placed parallel each other and the adjacent magnets have same magnetic field that is N pole to N pole and S pole to S pole. The central parts of magnets 4 are vacant. The element set bolt 80 is inserted to the vacant central, parts of magnets 4.

Non-magnetic support plates 5 have holes 14 which allow oil to go through. The plates 5 are arranged between the permanent magnets 4. Nuts 8 are put on the top of the element set bolt 80. The oil element case 82 is fixed to engine 83. The disc-shaped magnetic element A3 is placed inside of the oil element case 82 along with seat packing 84 and an oil element cap 1 is tightened. As the arrows of FIG. 5 indicate, the oil that comes into the inside of the oil filter passes through the holes 14 of the support plates 5 and then goes through the both ends of the disc-shaped permanent magnets that adjacent to the holes and goes into the central vacant part of set volt 80 and finally goes out to the inside of the engine. The oil flows as designed.

The above mentioned devise is applied to an element exchangeable oil flow filter for automobiles. It emits strong magnetic field lines which repel each other and it could be take out from automobiles for cleaning so that we do not have to use a disposable paper oil filter element.

The oil filter does not require conventional paper oil filters. The magnetic micro particles are surely absorbed to the disc-shaped permanent magnets while they pass between the magnets that repel each other as N pole against N pole and S pole against S pole. The bigger the scale of the magnet becomes the larger the adsorbing area will be. As a result, it is not necessary to clean the filter for a long period. If the magnetic field that emits magnetic field lines between the adjacent permanent magnets becomes larger, the oil passes through the magnetic field slower and it will prevent the oil from deterioration for a long time.

Preferably, the dimensions of the relatively large disc-shaped magnets 4 are such that the outer diameter of each magnet minus the diameter of the center hole (i.e., the inner diameter), divided by the width of each magnet, is greater or equal to 0.6. It has been found that this provides optimal performance characterizes.

The oil filter in FIG. 5 is applied to the element exchangeable oil flow filters for automobiles. but it could be applied to not only automobiles but also motorcycles, industrial vehicles, oil pressure machinery and air machinery with the same shaped element exchangeable oil filters as the oil filter in FIG. 5.

It is also important to note that no metal strainer element, such as that depicted as reference No. 10 in FIG. 3 of Japanese Patent No. 2516528, is required with use of the present invention. Strainer elements, of course, tend to clog with metallic particles and require periodic cleaning in order to prevent diminished performance.

Embodiment No. 6

Figure 6:
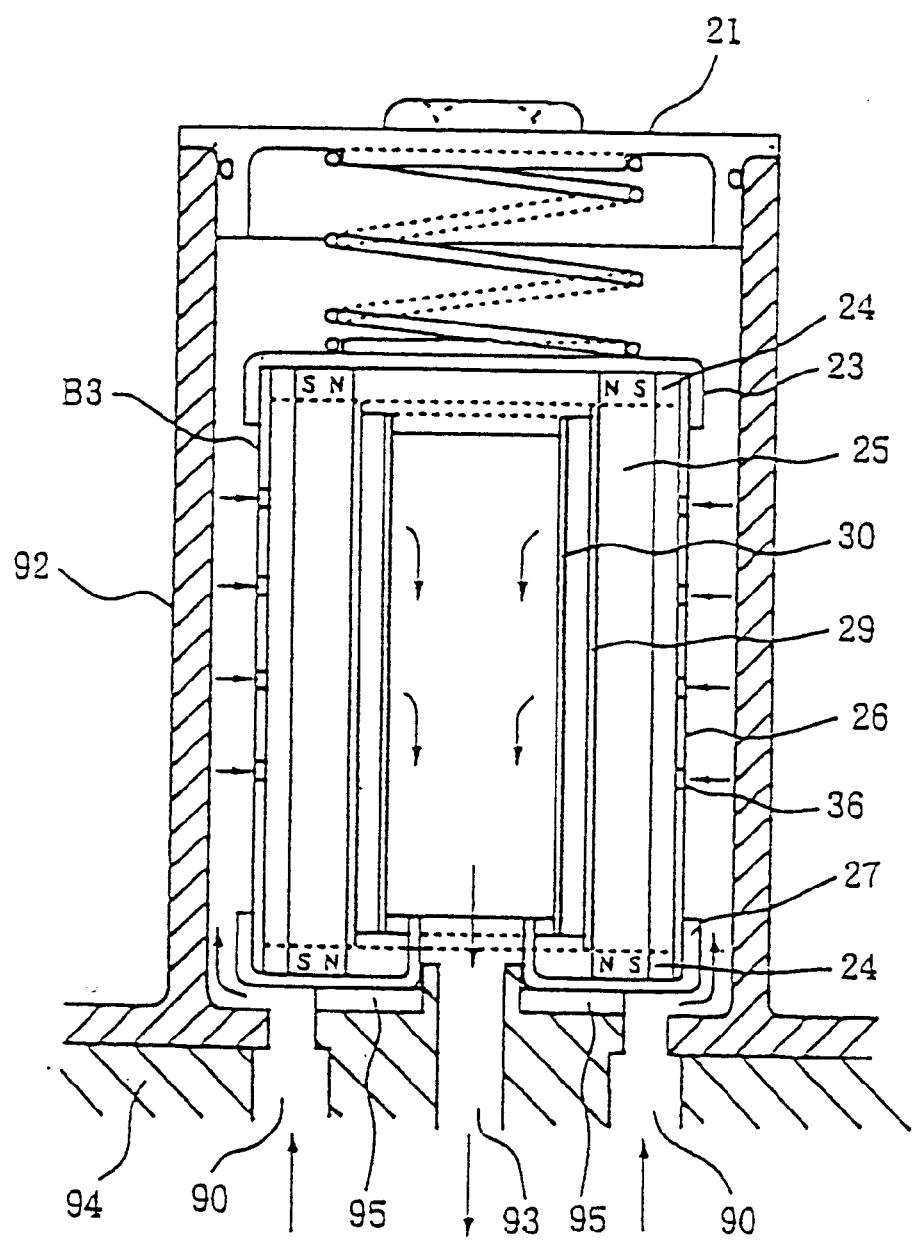
FIG. 6 describes another usage example with the newly invented paperless oil filter utilizing magnet as a filter insert.

FIG. 6 indicates another application of the oil filter not using a filter paper but using permanent magnets that replaces the inside cartridge type oil filter and which consists of a non-magnetic oil element case that is firmly attached to the machinery and an exchangeable disc-shaped magnetic element. In the diagram 6, stick-shaped permanent magnets 25 are arranged to form a circle with magnetic fields on their longer ends and a same interval between each magnet. The magnets are placed in the way so that all the same poles are outside of the circle or inside of the circle, that is; all N-poles are outside of the circle while all S-poles are inside of the circle or vice versa. The magnets 25 are fixed by attaching the set plates 24 to the both ends of the magnets. The first turbulent plate 29 and the second turbulent plate 30 are placed inside (of the permanent magnets and the plates 29 and 30 have holes to make oil flow turbulent. The magnets 25 and the plates 29 and 30 are fixed by an outside tube 26, a top end plate 23 and a bottom end plate 27. This type of the oil filter without using a filter paper is called a stick-shaped magnet type element B3.

The stick-shaped magnet type element B3 is placed inside of the oil element case 92 along with seat packing 95. The oil element case 92 is attached to an engine. And then an oil element cap 21 is tightened.

As the arrows of the diagram indicate, oil come into the inside of the oil filter through admission valves 90 and passes through the holes 36 of the outside tube 26 and goes through between the adjacent stick-shaped permanent magnets 25. Then it goes through the turbulent plates 29 and 30 and goes out to the inside of the engine 94. Oil flows as designed.

The oil filter does not require conventional paper oil filters. The magnetic micro particles are surely absorbed to the stick-shaped permanent magnets while they pass through between the magnets which repel each other as N pole against N pole and S pole against S pole. The bigger the scale of the magnet becomes the larger the adsorbing area will be. As a result, it is not necessary to clean the filter for a long period. If the magnetic field that emits magnetic field lines between the adjacent permanent magnets becomes larger, the oil passes through the magnetic field slower and it will prevent the oil from deterioration for a long time.

The oil filter in FIG, 6 is applied to the element exchangeable oil flow filters for automobiles, but it could be applied to not only automobiles but also motorcycles, industrial vehicles, oil pressure machinery and air machinery with the same shaped element exchangeable oil filters as the oil filter in FIG. 6.

The oil filter in FIG. 6 is applied to the element exchangeable oil flow filters for automobiles but it could be applied to not only automobiles but also motorcycles, industrial vehicles, oil pressure machinery and air machinery with the same shaped element exchangeable oil filters as the oil filter in FIG. 6.

Test Results

We conducted the test runs of automobiles with paper oil filters made by automobile makers and automobiles with oil filters not using filter papers on express highways to confirm the effect of the oil filters without filter papers.

Automobile I

| | |
|---|---|
| * Automobile Type | Domestic (Made in Japan) Blue Bird SSS |
| * The First Registration | October 1991 |
| * Engine | 1800 cc |
| * Test Run Highway | Tohoku Express Highway |
| * Odometer | 25,942 km |
| * Oil Type | API Standard-SH |
| * Tire Pressure | 2.0 kg/cm2 |

Automobile II

| | |
|---|---|
| *Automobile Type | Domestic (Made in Japan) Toyota Crown Diesel |
| *The First Registration | October 1991 |
| *Engine | 2 L 2,446 cc |
| *Test Run Highway | Tohoku Express Highway |
| *Odometer | 83,246 km |
| *Oil Type | API Standard-CD |
| *Tire Pressure | 2.2 kg/cm2 |

We used the same two vehicles for each days's test runs and specified the speed at IC (inter-changes) to compare the differences between the filters with papers and the filters without filter papers. The average speed of the automobile was specified at 90–100 km which is not effected by traffic. We measured the time at each IC to confirm the speed of the vehicle. We also measured the velocity of the wind, temperature and moisture at SA (service areas).

The First Day

| | | |
|---|---|---|
| Estimated mileage of test run on declined express highways | 600 km | measure the fuel economy |

The Second Day

| | | |
|---|---|---|
| Estimated mileage of test run on regular | 450 km | breaking-in |

-continued city street streets
The Third Day

| | | |
|---|---|---|
| Estimated mileage of test run on uphill express highways | 600 km | measure the fuel economy |

The results of the test run mileage and fuel economy of Automobile I is on Table 1. The analysis of the oil of Automobile I after it ran 1900 km is on Tables 2 and 3.

TABLE 1

| | Test 1<br>Oil filter with paper elements | Test 2<br>The new paperless oil filter | Improvement (%) |
|---|---|---|---|
| Highway distance on day 1 | 602 kilometers | 602 kilometers | 4.7 |
| Fuel economy | 15.05 kilometer/liter | 15.76 kilometer/liter | |
| City street distance on day 2 | 442.7 kilometers | 446.5 kilometers | — |
| Fuel economy | 12.57 kilometer/liter | 12.43 kilometer/liter | |
| Highway distance on day 3 | 599.8 kilometers | 601.8 kilometers | 7.1 |
| Fuel economy | 16.96 kilometer/liter | 18.18 kilometer/liter | |

TABLE 2

Oil Analysis Result

| | I<br>Fresh oil | II<br>Driven 1,900 km with oil filter with paper elements | III<br>Driven 1,900 km with the new paperless oil filter |
|---|---|---|---|
| Water (%) | <0.05 | <0.05 | <0.05 |
| Solids (%) | <0.1 | 0.1 | 0.1 |
| Fuel (%) | <0.1 | 2.2 | 1.4 |
| Viscosity (cs, at 40C) | 49.87 | 51.14 | 43.10 |
| Viscosity (cs, at 100C) | 9.69 | 9.32 | 9.18 |
| Viscosity index | 184 | 167 | 176 |
| Total base number | 5.51 | 2.64 | 3.94 |

TABLE 3

Oil Analysis Result (wt ppm)

| Metallic elements | I<br>Fresh oil | II<br>Driven 1,900 km with oil filter with paper elements | III<br>Driven 1,900 km with the new paperless oil filter |
|---|---|---|---|
| Fe | 1 | 8 | 4 |
| Pb | 1 | 5 | 2 |
| Cu | 1 | 7 | 3 |
| Cr | 0 | 1 | 0 |
| Al | 3 | 3 | 3 |
| Ni | 0 | 0 | 1 |
| Ag | 0 | 0 | 0 |
| Sn | 0 | 0 | 0 |
| Si | 6 | 19 | 15 |
| B | 205 | 134 | 174 |
| Na | 9 | 102 | 32 |
| P | 880 | 899 | 894 |
| Zn | 911 | 991 | 961 |
| Ca | 2227 | 1979 | 2224 |
| Ba | 0 | 3 | 1 |
| Mg | 10 | 128 | 36 |
| Mo | 271 | 186 | 246 |

The comparison between the analysis of the oil from the oil filter using conventional filter paper and the oil filter not using filter paper but permanent magnets is as follows.

1. There is no difference on water between them.
2. Little solid (e.g. tar) was generated in both oil.
3. Adulteration of fuel into the oil is less in the oil from the oil filter with permanent magnets than the filter with filter papers.
4. The change of viscosity is less in the oil filter with permanent magnet than the other.
5. Decrease of hydroxyl equivalent is less in the oil filter with permanent magnets than the other.

Figure 7:
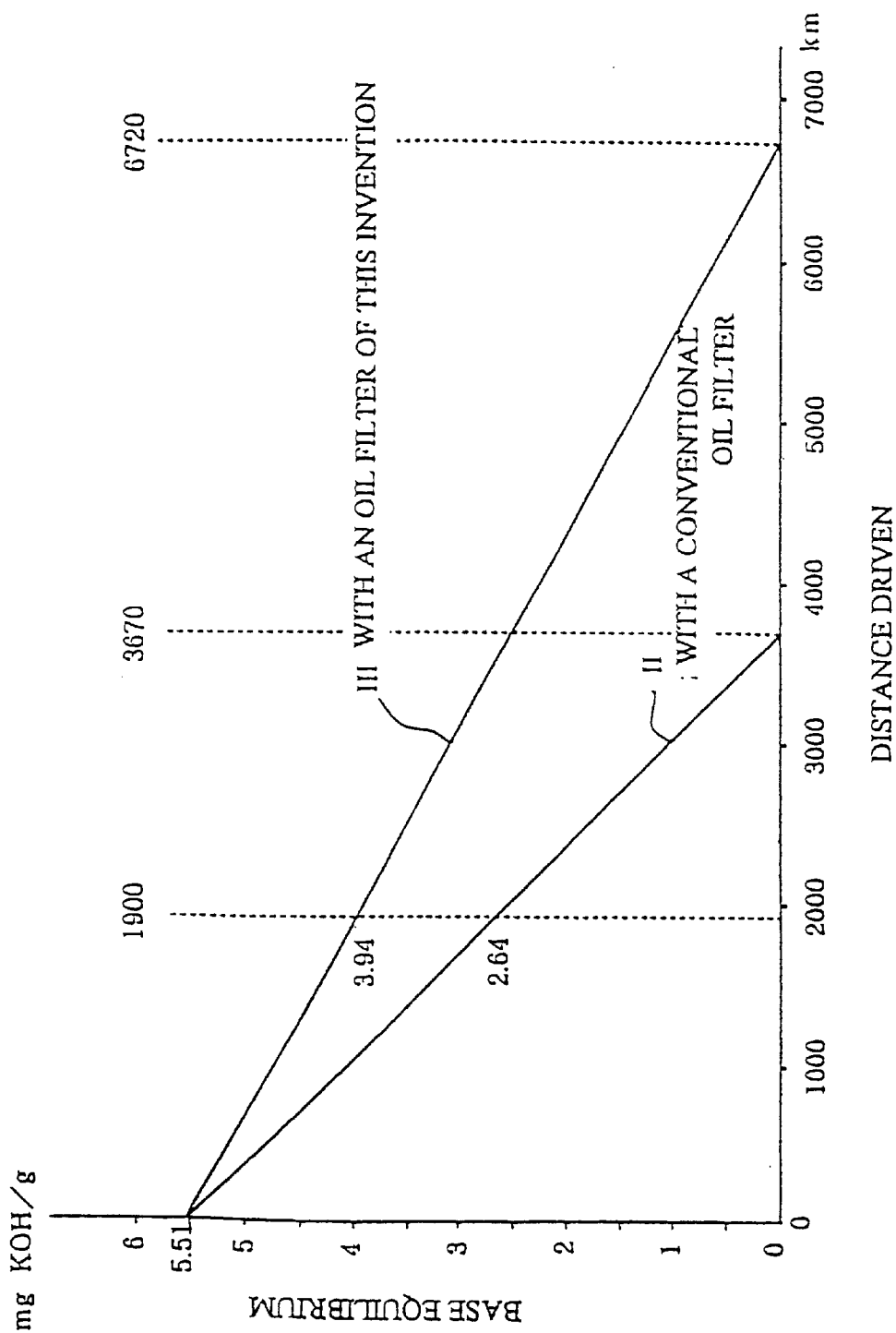
FIG. 7 is a graphic representation of the decline in hydroxyl equivalent (mg KOH/g) measured on specified vehicle using the present invention in comparison to a conventional paper oil filter.

FIG. 7 indicates how hydroxyl equivalent of the oil from Automobile 1 decreases. The axis of ordinates is hydroxyl equivalent(mg KOH/g) and the axis of abscissas is mileage (km). The hydroxyl equivalent decreases to zero at the mileage of 3670 km after the continuous drive with high speed for three days due to rapid degradation of oil caused by high temperature. In practice, the hydroxyl equivalent is supposed to decrease to zero at the mileage of 3000 km due to rapid degradation of the oil caused by not only high temperature but also heat as the result of friction generated by adulteration of oil.

The oil filter not using filter papers but permanent magnets enhances the wrapping process within an engine and it helps to decrease heat produced by friction. The filter also decreases adulteration of blow-by gas into oil and it prevents oil from degradation. As a result, the hydroxyl equivalent of oil decreases in a straight line. The span of oil life for the oil used with the invented oil filter is supposed to become twice longer than that for the oil used with the conventional oil filter.

6. The effect of the invented oil filter is apparent considering the improvement in fuel economy and the comparison in degradation of oil between the oil used with the invented oil filter and the conventional oil filter.
7. The invented oil filter adsorbs micro magnetic particles produced by friction. It prevents oil from continuous abrasion afterward. It means that oil filter has effects on prevention of oil from degradation due to abrasion by utilizing magnetic fields and oil could be used for a long time.

The result of the test run mileage and fuel economy of Automobile II is on Table 4.

TABLE 4

|  | Test 1<br>Oil filter with<br>paper elements | Test 2<br>The new<br>paperless oil filter | Test 3<br>The new<br>paperless oil<br>filter | Improvement<br>(%) |
|---|---|---|---|---|
| Odometer reading at oil change | 83,246 kilometer | 85,431 kilometer | 88,949 kilometer | — |
| Day 1 Highway distance | 610 kilometers | 610 kilometers | 610 kilometers | 3.46 |
| Fuel economy | 13.55 kilometer/liter | 13.60 kilometer/liter | 14.02 kilometer/liter |  |
| Day 2 City street distance | 563 kilometers | 548 kilometers | 580 kilometers | 7.82 |
| Fuel economy | 10.48 kilometer/liter | 10.66 kilometer/liter | 11.30 kilometer/liter |  |
| Day 3 Highway distance | 610 kilometers | 610 kilometers | 610 kilometers | 16.98 |
| Fuel economy | 13.72 kilometer/liter | 14.42 kilometer/liter | 16.05 kilometer/liter |  |

Gasoline was used for the test runs of Automobile I, but diesel was used for the test runs of Automobile H. Even the test runs of the express highways used by diesel that is degraded worse than gasoline, the improvement of fuel economy was reported when the invented oil filter was used. It is considered as effects of the invented oil filter.

Within recent scores of years, performance as well as the popularity of automobiles have advanced surprisingly. At the same time, restrictions such as the "Muskie Law" relating to exhaust gases from automobiles have strengthened. An analysis of exhaust gases was conducted at CE-CERT in Riverside Calif. As illustrated below in Table 5, an analysis of the exhaust gas from a car equipped with the present invention after a 3000 mile test drive showed better results than the exhaust gases from the same car with brand new oil.

TABLE 5

Weighted Average Data

| | THC g/mi | NMUC g/mi | Co g/mi | $NO_x$ g/mi | Fuel MPG |
|---|---|---|---|---|---|
| ① | 0.069 | 0.062 | 0.741 | 0.100 | 25.05 |
| ② | 0.054 | 0.047 | 0.698 | 0.096 | 25.69 |

| | THC % | NMHC % | Co % | $NO_x$ % | Fuel % |
|---|---|---|---|---|---|
| ① | 100 | 100 | 100 | 100 | 100 |
| ② | 78.26 | 75.80 | 94.19 | 96.00 | 102.55 |

| BASIC DATA | | UCR CE-CERT TEST NO | |
|---|---|---|---|
| VEHICLE ID | : JT2BG22K3W0250865 | ① H9905021 | |
| VEHICLE MODEL | : 98 Toyota Camry | H9905031 | |
| ENGINE TYPE | : 2.2 L | H9905033 | |
| ODOMETER | : ① 20425 | ② H9906072 | |
| | ② 30557 | H9906073 | |
| TRANSMISSION | : 4 spd. Auto | H9906078 | |

Figure 8:
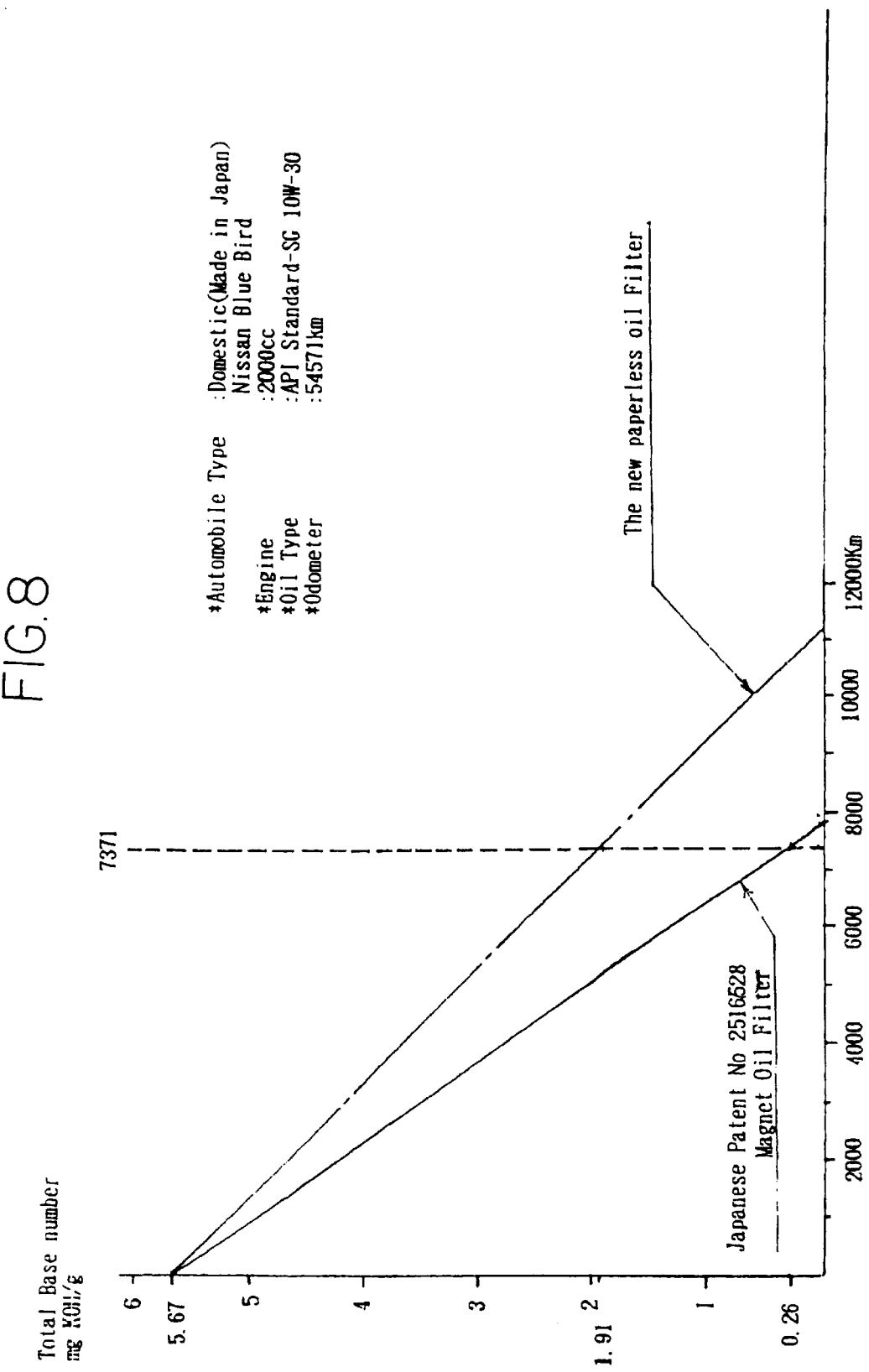
FIG. 8 is a graphic representation of the decline in hydroxyl equivalent (mg KOH/g) measured on a specified vehicle using the present invention in comparison to the filter of Japanese Patent No. 2516528.

In addition, a test was conducted and a comparison between the analysis of the oil from the filter disclosed in Japanese Patent No. 2516528, and the oil filter of the present invention was made. In a manner, similar to FIG. 7, FIG. 8 illustrates the superior performance of the oil filter of the present invention by showing that the decrease in the total base number is less as compared to the decrease for the device of Japanese Patent No. 2516528.

Possibility of Industrial Usage

As stated above, oil goes through between magnetic fields that repel each other (N-poles against N-pole or S-pole against S-pole) continuously in the invented oil filter without a conventional filter paper. As a result, the filter strongly prevents oil from degradation by increase of stabilized molecules along with adsorption of micro magnetic particles.

The invented oil filters keep good conditions of internal combustion engines, transmissions, reduction gears, and oil presser machinery in automobiles, ships, trains, other industrial vehicles and machinery. It lengthens life span of machinery, saves fuel cost and reduces environmental polluted gas. It make possible to use oil filter continuously for a long time and stop deforestation for producing filter papers.

The invention claimed is:

1. An oil filter, not using a filter paper element, and not using a strainer component, said filter comprising relatively large permanent magnets configured in an array, said array dimensioned to occupy an area which is substantially equal to an area within a case for said array of permanent magnets, such that said array substantially fills the entire area of said case element, said array further comprising a plurality of individual permanent magnets positioned in opposing polar relationship and separated equidistantly from one another by non-magnetic, perforated separation elements, said equidistant separation interval being less than one-half of an interval that said individual permanent magnets would naturally repel one another as a result of a magnetic field existing therebetween.

2. An oil filter as recited in claim 1, wherein said array of individual permanent magnets further comprises a plurality of disc-shaped permanent magnets having circular center apertures and being stacked vertically and separated by said separating elements within said case element.

3. An oil filter as recited in claim 2, wherein said disc-shaped magnets have an outer diameter and a thickness and wherein the difference between the said outer diameter and a diameter of said circular center apertures, divided by said thickness is greater than or equal to 0.6.

4. An oil filter as recited in claim 2, wherein said disc-shaped individual permanent magnets have yokes attached to both sides of each magnet.

5. An oil filter as recited in claim 4, wherein said separation interval between adjacent individual permanent magnets is less than one-half of an interval that said individual permanent magnets including the mass of said yokes would naturally repel one another as a result of a magnetic field existing therebetween.

6. An oil filter, not using a filter paper element and not having a strainer component, said filter comprising a plurality of relatively large disc-shaped permanent magnets configured in an array, said array dimensioned to occupy an area which is substantially equal to an area within a case for said array of disc-shaped permanent magnets, such that said array substantially fills the entire area of said case element, said plurality of disc-shaped magnets positioned in opposing polar relationship and separated equidistantly from one another by non-magnetic, perforated separation elements, said equidistant separation interval being less than one-half of an interval that said individual disc-shaped permanent magnets would naturally repel one another as a result of a magnetic field existing therebetween.

7. An oil filter as recited in claim 6, wherein said individual disc-shaped permanent magnets are stacked vertically and separated by said separation elements and wherein said disc-shaped magnets have an outer diameter and an inner diameter, the difference between said diameters, divided by a thickness of said magnets being greater than or equal to 0.6.

8. An oil filter as recited in claim 6, wherein said disc-shaped individual permanent magnets have yokes attached to both sides of each magnet.

9. An oil filter as recited in claim 8, wherein said separation interval between adjacent individual permanent magnets is less than one-half of an interval that said individual permanent magnets including the mass of said yokes would naturally repel one another as a result of a magnetic field existing therebetween.

10. An oil filter, not using a filter paper element and not having a strainer component, said filter comprising a plurality of stick-shaped relatively large permanent magnets configured in an array, said array dimensioned to occupy an area which is substantially equal to an area within a case for said array of said permanent magnets, such that said array substantially fills the entire area of said case element, and wherein said individual permanent magnets are positioned equidistantly from one another in opposing polar relationship, said equidistant separation interval being less than one-half of an interval that said individual permanent magnets would naturally repel one another as a result of a magnetic field existing therebetween.

11. An oil filter as recited in claim 10, wherein said individual stick-shaped permanent magnets are arranged to form a circle such that all the north poles of the individual magnets are outside of the circle.

12. An oil filter as recited in claim 10, wherein the individual stick-shaped permanent magnets are arranged to form a circle such that all the north poles of the individual magnets are inside the circle.

13. An oil filter as recited in claim 11, wherein the filter further comprises turbulent plates with holes arranged between the individual stick-shaped permanent magnets in order to facilitate the removal of metallic particles.

14. An oil filter as recited in claim 12, wherein the filter further comprises turbulent plates with holes arranged between the individual stick-shaped permanent magnets in order to facilitate the removal of metallic particles.

* * * * *